United States Patent Office 3,793,333
Patented Feb. 19, 1974

---

3,793,333
2-(1-BENZYL-4-PIPERIDYL)ACID HYDRAZIDES
Mario G. Buzzolini, Morristown, and Faizulla G. Kathawala, West Orange, N.J., assignors to Sandoz-Wander, Inc., Hanover, N.J.
No Drawing. Continuation of abandoned application Ser. No. 62,662, Aug. 10, 1970. This application Nov. 20, 1972, Ser. No. 308,301
Int. Cl. C07d 31/44
U.S. Cl. 260—293.69           3 Claims

ABSTRACT OF THE DISCLOSURE 2-(1-benzyl - 4 - piperidyl)acid hydrazides, e.g., 2-(1-4-piperidyl)benzoic acid hydrazide are prepared by reducing 2-(1-benzyl-4-piperidylidene) acid hydrazides. The compounds are useful as hypolipidemic agents.

---

This is a continuation of application Ser. No. 62,662, filed Aug. 10, 1970, and now abandoned.

This invention relates to 2-(1-benzyl-4-piperidyl)acid hydrazides. More particularly, it relates to 2-(1-benzyl-4-piperidyl) benzoic, p-fluorobenzoic or isonicotinic acid hydrazides, acid addition salts thereof, intermediates thereof, to their method of preparation, and to their use as hypolipidemic agents. The invention also relates to pharmaceutical compositions containing the above compounds as an active ingredient thereof and the method of using such compositions for the treatment of hyperlipidemia.

The compounds of this invention may be represented by the following structural formula

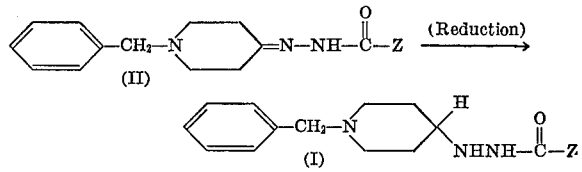

wherein Z is phenyl, p-fluorophenyl or 4-pyridyl.

The compound of Formula I where Z is phenyl is known (A. Badger, Library of Rare Chemicals, Compound No. 534,153–3), and the present invention only contemplates the novel use of such compound as a hypolipidemic agent. The other compounds encompassed by Formula I are novel and they also are useful as hypolipidemic agents.

The compounds of Formula I may be prepared by the following reaction scheme A:

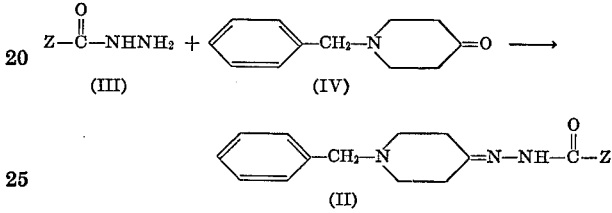

wherein Z has the above stated significance.

The compounds of Formula I are prepared by reducing a compound of Formula II with a metallic hydride which will selectively reduce the double bond in the presence of the carbonyl group. Examples of metallic hydrides which may be used are diisobutylaluminium hydride, sodium borohydride and the like. The reaction may be carried out in a solvent such as benzene, toluene and the like, ethers such as tetrahydrofuran, dioxane diethyl ether and the like, and at a temperature of from 0° to 80° C., preferably 15°–30° C. Neither the solvents nor the temperatures used are critical.

The compounds of Formula I may also be prepared by the hydrogenation, with one equivalent of hydrogen of a compound of Formula II in a solvent such as lower alkanols having 1 to 4 carbon atoms, e.g. methanol, ethanol, propanol, isopropanol, butanol or isobutanol at a temperature of from 10° C. to the reflux temperature of the solvent.

The compounds of Formula I may be prepared in acid addition salt form, such as the hydrochloride, by conventional methods, such as suspending the compound in alcohol and treating with the appropriate acid. When it is desired to convert such salts to the corresponding free bases, conventional techniques may be utilized, e.g. dissolution of the salt in water and precipitation using a base such as sodium hydroxide.

The compounds of Formula I may be recovered using conventional recovery techniques such as crystallization.

The compounds of Formula II may be prepared by the following reaction scheme B:

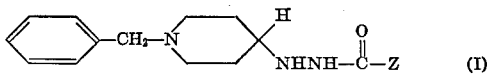

The compounds of Formula II are prepared by treating a compound of Formula III with a compound of Formula IV, preferably in an inert solvent such as a lower alkanol having from 1 to 4 carbon atoms such as methanol, ethanol, propanol, isopropanol, butanol and isobutanol, or an aromatic hydrocarbon such as benzene, xylene, toluene and the like at a temperature of from 20° C. to the reflux temperature of the solvent, preferably 50° to 90° C. Neither the solvents nor the temperatures used are critical.

The compounds of Formula I are useful because they possess pharmacological activity in animals. In particular the compounds are useful as hypolipidemic agents, as indicated by their activity in white rats which are given typically 10–250 milligrams per kilogram of body weight per diem of the compound orally, for 19 days, followed by extraction with isopropanol of serum or plasma after anesthetizing the rats with sodium hexobarbital, and then noting the cholesterol content as compared to that of a control group. The cholesterol content is determined by the Technicon method N 24a. For such usage, the compounds may be administered orally as such or admixed with conventional pharmaceutical carriers.

As indicated, the compounds of Formula I are useful as hypolipidemic agents. For such usage, the compounds may be administered orally or parenterally as such or admixed with conventional pharmaceutical carriers. They may be administered orally in such forms as tablets, dispersible powders, granules, capsules, syrups and elixirs, and parenterally as solutions, suspensions, dispersions, emulsions, and the like; e.g. a sterile injectable aqueous suspension. The compositions for oral use may contain one or more conventional adjuvants, such as sweetening agents, flavoring agents, coloring agents and preserving agents, in order to provide an elegant and palatable preparation. Tablets may contain the active ingredient in admixture with conventional pharmaceutically acceptable excipients, e.g., inert diluents, such as calcium carbonate, sodium carbonate, lactose and talc, granulating and disintegrating agents, e.g. starch and alginic acid, binding agents, e.g., starch, gelatin and acacia, and lubricating agents, e.g., magnesium stearate, stearic acid and talc. The tablets may be uncoated or coated by known techniques to delay disintegration and absorption in the gastro-intestinal tract and thereby provide a sustained action over a longer period. Similarly, suspensions, syrups and elixirs may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan mono-oleate) and preservatives (ethyl-p-hydroxybenzoate). Capsules may contain the active ingredient alone or admixed with an inert solid diluent, e.g., calcium carbonate, calcium phosphate and kaolin. The injectable compositions are formulated as known in the art and may contain appropriate dispersing or wetting agents and suspending agents identical or similar to those mentioned above. These pharmaceutical preparations may contain about 10–90% of the active ingredient in combination with the carrier or adjuvant.

The compounds of Formula I may be similarly administered in the form of their non-toxic pharmaceutically acceptable acid addition salts. Representative of such salts are the hydrobromide, sulfate, phosphate, succinate, benzoate, acetate and the like. Such salts possess the same order of activity as the free base.

The dosage administered for the hypolipidemic use may vary depending on the particular compound employed, the therapy desired and the severity of the condition being treated. In general, satisfactory results are obtained when administered at a daily dosage of from about 10 milligrams to about 1 gram per kilogram of animal body weight, preferably given in divided doses, 2 to 4 times a day, or in sustained release form. For most larger mammals (e.g., primates) the total daily dosage is from about 10 milligrams to about 750 milligrams of the compound and the dosage forms suitable for internal use comprise from about 2.5 milligrams to about 375 milligrams of active compound in intimate admixture with a solid or liquid pharmaceutically acceptable carrier or diluent.

This invention is illustrated but not limited by the following examples.

EXAMPLE 1

2-(1-benzyl-4-piperidyl)-p-fluorobenzoic acid hydrazide 12.1 g. of N-benzyl-4-piperidone is added to a solution of 10 g. of p-fluorobenzoic acid hydrazide in 75 ml. of ethanol and the mixture is refluxed for 4 hours. The intermediate 2-(1-benzyl-4-piperidylidene)-p-fluorobenzoic acid hydrazide crystallizes upon cooling at room temperature and is recrystallized from ethanol, M.P. 151.153° C.

18.6 ml. of a 25% solution of diisobutylaluminum hydride in toluene is added dropwise at room temperature to a solution of 4.0 g. of the intermediate p-fluorobenzoic acid, 2-(1-benzyl-4-piperidylidene)hydrazide in 100 ml. anhydrous benzene and 20 ml. anhydrous tetrahydrofuran. The reaction mixture is allowed to stir at room temperature for 2 hours. After careful addition of 15 ml. of methanol and 15 ml. of water, the resulting mixture is poured into 200 ml. of water and extracted with ethyl ether. The ethereal layer is washed neutral with a sat. sodium chloride solution, dried over anhydrous magnesium sulfate and evaporated. The resulting product 2-(1-benzyl-4-piperidyl)p-fluorobenzoic acid hydrazide is recrystallized from benzene, M.P. 98–99° C.

Following the above procedure, but in place of p-fluorobenzoic acid hydrazide starting with (a) benzoic acid hydrazide, or
(b) isonicotinic acid hydrazide, the intermediate compounds (a) 2-(1-benzyl-4-piperidylidene)benzoic acid hydrazide, M.P. 167.5°–168° C., and
(b) 2-(1-benzyl-4-piperidylidene)isonicotinic acid hydrazide, M.P. 173.5°–174° C., and the final compounds (a) 2-(1-benzyl-4-piperidyl)benzoic acid hydrazide, M.P. 127°–129° C., and
(b) 2-(1-benzyl-4-piperidyl)isonicotinic acid hydrazide, M.P. 109.5°–111° C., are prepared.

EXAMPLE 2

Tablets—Tablets suitable for oral administration which contain the following ingredients may be prepared by conventional tabletting techniques. Such tablets are useful in treating obesity or diabetes at a dose of one tablet 2 to 4 times a day.

| Ingredients: | Weight (mg.) |
|---|---|
| 2-(1-benzyl-4-piperidyl)benzoic acid hydrazide | 100 |
| Tragacanth | 10 |
| Lactose | 197.5 |
| Corn starch | 25 |
| Talcum | 15 |
| Magnesium stearate | 2.5 |

EXAMPLE 3

Dry filled capsules—Capsules suitable for oral administration which contain the following ingredients are prepared in a conventional manner. Such capsules are useful in treating obesity or diabetes at a dose of one capsule 2 to 4 times a day.

| Ingredients: | Weight (mg.) |
|---|---|
| 2-(1-benzyl-4-piperidyl)benzoic acid hydrazide | 100 |
| Inert solid diluent (starch, lactose, kaolin) | 200 |

EXAMPLE 4

The following formulations for syrups or elixirs containing an effective amount of active compound may be formulated using conventional methods.

| | Percent by weight | |
|---|---|---|
| | Syrup | Elixir |
| 2-(1-benzyl-4-piperidyl)benzoic acid hydrazide | .5–3.5 | .5–3.5 |
| Buffering system | (1) | (1) |
| Sodium benzoate | .1–.5 | .1–.5 |
| Flavoring agent | .01–.2 | .01–.2 |
| Water | 20–40 | 5–20 |
| Simple syrups U.S.P. | 30–70 | 0 |
| Sorbitol solution (70%) | 10–30 | 20–60 |
| Certified dye | .5–2 | .5–2 |
| Alcohol | 0 | 2.5–20 |
| Methyl paraben | 0 | .05–.1 |
| Propyl paraben | 0 | .05–.1 |
| Sodium saccharin | 0 | .01–.08 |

[1] Quantity sufficient to adjust pH.

EXAMPLE 5

Sterile solution for injection—The following ingredients are dissolved in water for injection. The resulting solution is filtered through an appropriate medium to render a clear solution. The solution is then autoclaved to render it sterile.

| Ingredient: | Weight (percent) |
|---|---|
| 2-(1-benzyl-4-piperidyl)benzoic acid hydrazide | 10 |
| Sodium alginate | 0.5 |
| Buffer system | As desired |
| Lecithin | 0.5 |
| Sodium chloride | As desired |
| Water for injection | To desired volume |

What is claimed is:
1. A compound of the formula

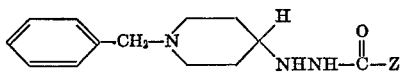

wherein Z is p-fluorophenyl or 4-pyridyl, or a pharmaceutically acceptable acid addition salt thereof.

2. The compound of claim 1 which is 2-(1-benzyl-4-piperidyl) p-fluorobenzoic acid hydrazide.

3. The compound of claim 1 which is 2-(1-benzyl-4-piperidyl)isonicotinic acid hydrazide.

References Cited

A. Bader, Library of Rare Chemicals, compound #534, 153–3.

HENRY R. JILES, Primary Examiner

S. D. WINTERS, Assistant Examiner

U.S. Cl. X.R.

260—293.77, 293.52; 424—267